United States Patent [19]

Perkins

[11] 4,170,202
[45] Oct. 9, 1979

[54] INTERNAL COMBUSTION ENGINE

[76] Inventor: Charles M. Perkins, R.F.D. 2, Albion, Ill. 62806

[21] Appl. No.: 800,568

[22] Filed: May 25, 1977

[51] Int. Cl.² .................... F02B 19/02; F02B 19/14
[52] U.S. Cl. .................. 123/75 B; 123/32 C; 123/33 VC; 123/143 A
[58] Field of Search ............ 123/32 C, 32 D, 32 ST, 123/32 SP, 33 D, 33 VC, 143 A, 75 B

[56] References Cited

U.S. PATENT DOCUMENTS

| | | | |
|---|---|---|---|
| 1,904,799 | 4/1933 | Palmer | 417/471 |
| 2,107,302 | 2/1938 | Le Blanc | 123/143 A |
| 2,141,787 | 12/1938 | Honn | 123/143 A |
| 2,158,124 | 5/1939 | Honn | 123/143 A |
| 3,406,667 | 10/1968 | Evans et al. | 123/32 SP X |
| 3,580,231 | 5/1971 | Bradbury | 123/33 VC X |

Primary Examiner—Charles J. Myhre
Assistant Examiner—Tony M. Argenbright
Attorney, Agent, or Firm—Robert K. Youtie

[57] ABSTRACT

An internal combustion engine which includes a main combustion chamber, and which is improved by the inclusion of an auxiliary combustion chamber, an ignition valve for controlling the establishment of communication between the main and auxiliary chambers, auxiliary fuel mixture feed means for feeding the auxiliary chamber, and an auxiliary piston in the auxiliary chamber for compressing the fuel mixture therein to ignition when the main chamber contains a compressed charge of fuel mixture, whereby opening of the valve means during ignition in the auxiliary chamber communicates combustion to the main chamber for ignition therein of a relatively lean fuel mixture.

1 Claim, 7 Drawing Figures

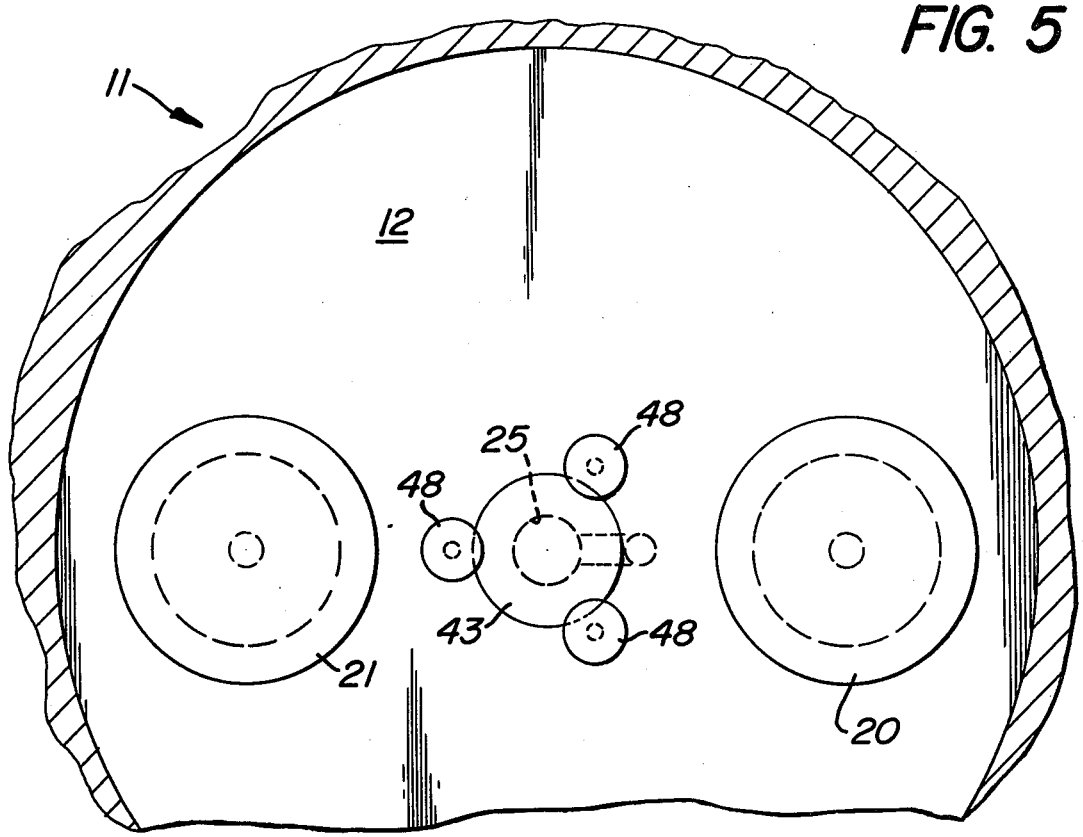
FIG. 5
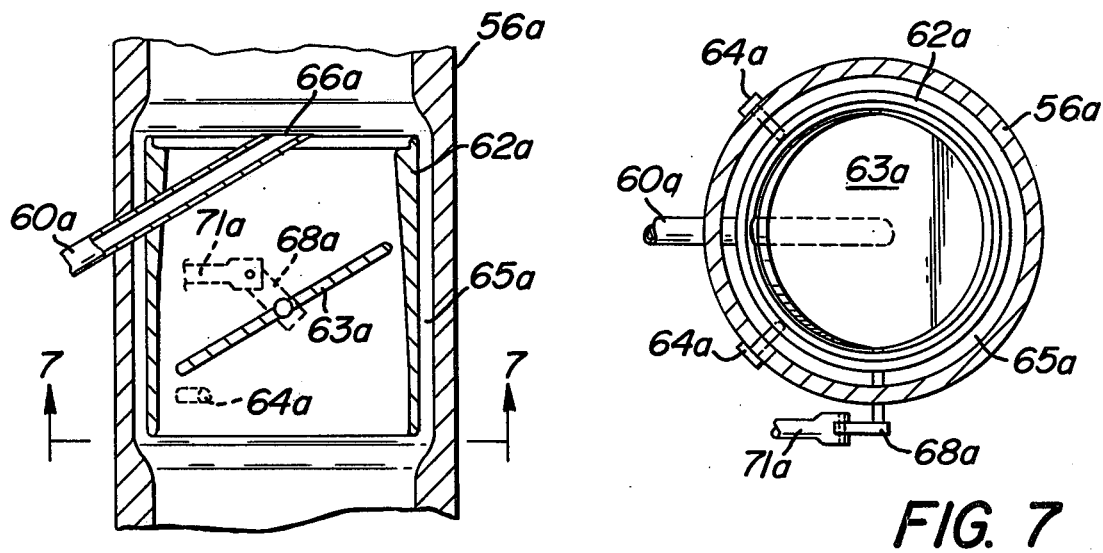
FIG. 6
FIG. 7

INTERNAL COMBUSTION ENGINE

BACKGROUND OF THE INVENTION

As is well known to those versed in the internal combustion engine art, the ignition of lean mixtures is highly desirable for efficiency and economy. However, ignition of lean mixtures, especially in Diesel cycle engines, presents difficulties, both in thoroughness or completeness of ignition and accuracy or precision of ignition timing. Even in spark ignition type engines the ignition of efficiently lean mixtures presents difficulties under certain conditions.

SUMMARY OF THE INVENTION

Accordingly, it is an important object of the present invention to provide an internal combustion engine including unique and highly advantageous means for effectively assuring precisely timed and efficiently consumed lean fuel mixtures under substantially all conditions of engine operation.

It is a more particular object of the present invention to provide in an internal combustion engine an auxiliary cylinder and piston for combustion therein of a relatively rich or otherwise easily ignited mixture, which combustion them communicates with a compressed lean mixture in a main combustion chamber to assure precisely timed and highly efficient combustion of the lean mixture.

It is another object of the present invention to provide auxiliary chamber ignition means as set forth in the preceding paragraph together with fuel flow control means associated with the main combustion chamber mixture charge to selectively vary the leaness of the charge while maintaining an optimum supply of air to the main combustion chamber.

Another object of the present invention resides in the provision of advantageous means to prevent or minimize the possibility of detonation or knocking in a cold operating high compression engine, by substantially automatically reducing the engine compression.

It is still a further object of the present invention to provide a lean burn internal combustion engine construction having the advantageous characteristics mentioned in the preceding paragraphs which is extremely simple in construction for great reliability in operation and in durability throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 5 is a sectional view taken generally along the line 5—5 of FIG. 1, enlarged for clarity.

FIG. 6 is a partial sectional view showing a slightly modified embodiment of fuel mixture feed means in accordance with the teachings of the present invention.

FIG. 7 is a sectional view taken generally along the line 7—7 of FIG. 6.

DESCRIPTION OF THE PREFERRED EMBODIMENT

Figure 1:
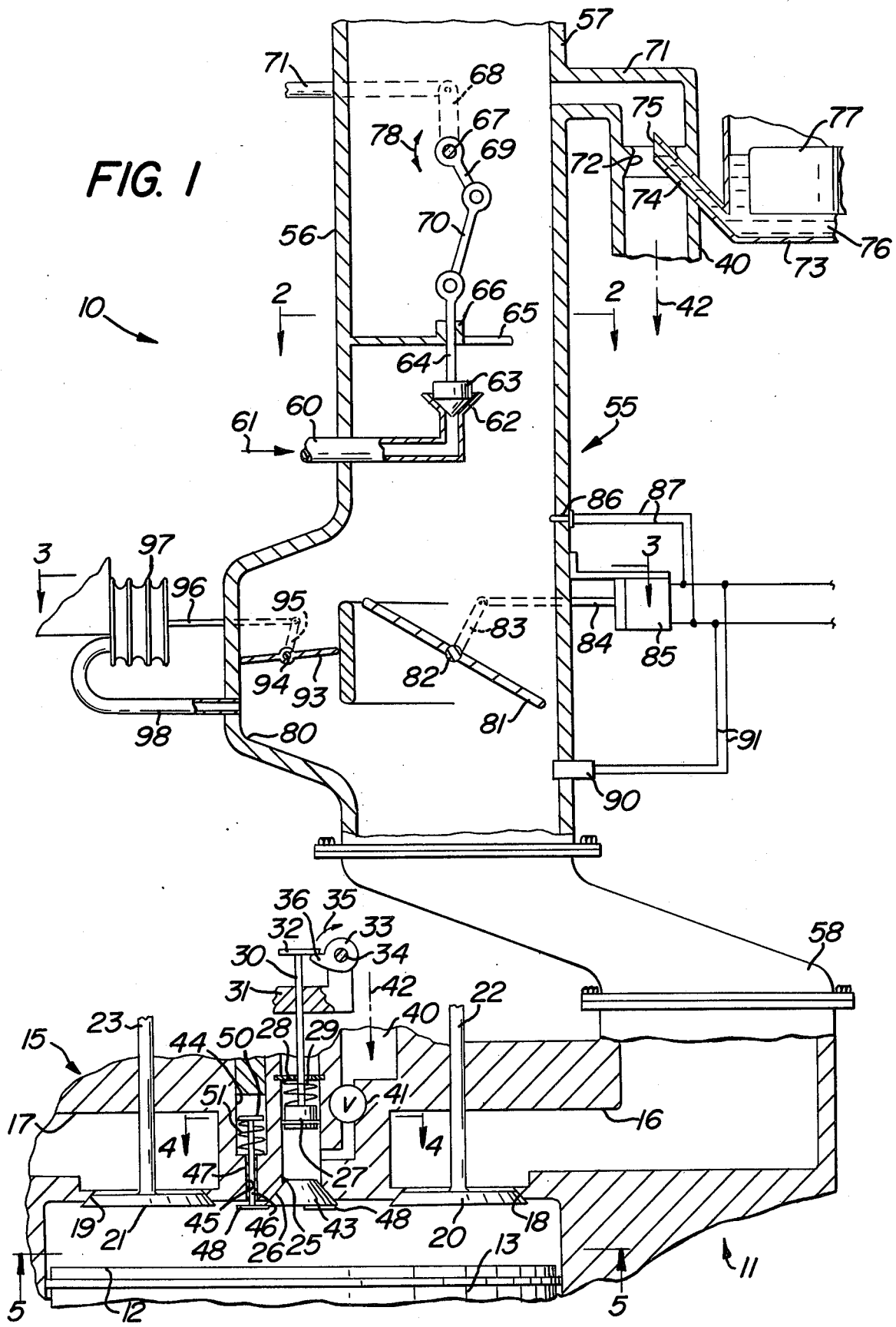
FIG. 1 is a partial longitudinal sectional view showing an internal combustion engine constructed in accordance with the teachings of the present invention.
Figure 2:
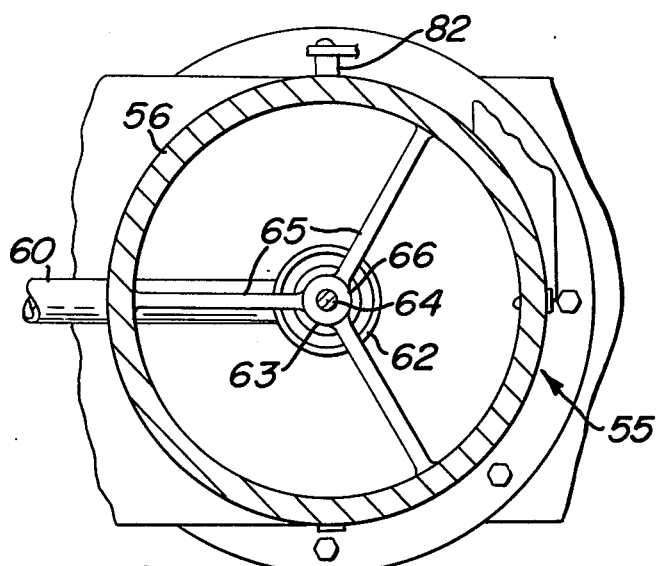
FIG. 2 is a sectional view taken generally along the line 2—2 of FIG. 1.
Figure 3:
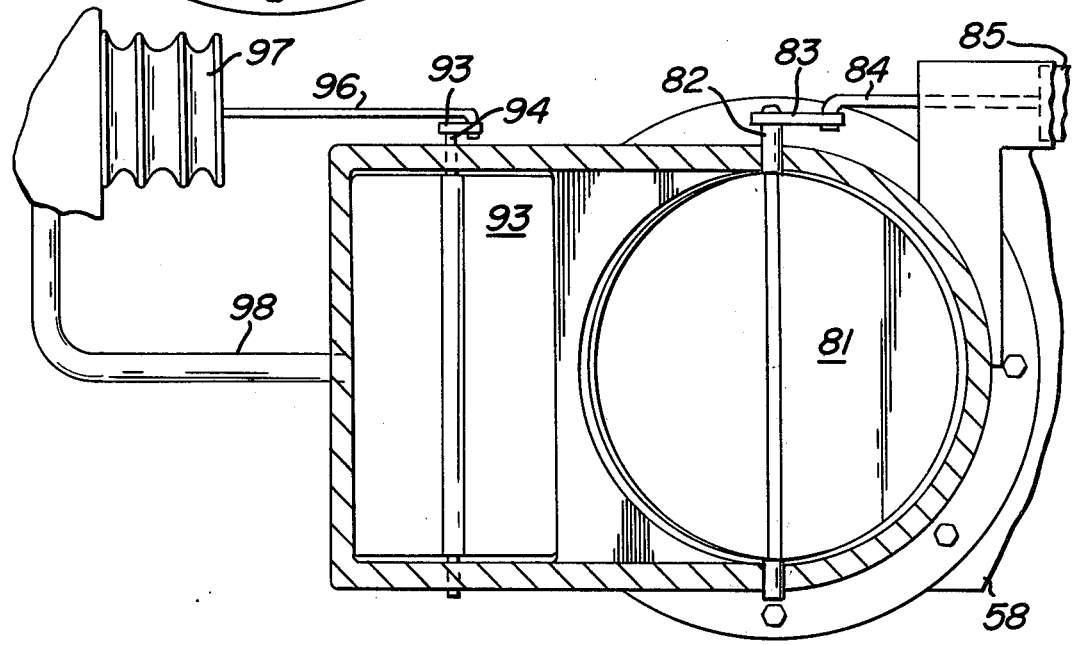
FIG. 3 is a sectional view taken generally along the line 3—3 of FIG. 1.

Referring now more particularly to the drawings, and specifically to FIG. 1 thereof, an internal combustion engine is generally designated 10, and includes a cylinder block 11 formed with at least one internal combustion chamber or cylinder 12, which may be considered a main combustion chamber or cylinder, as will appear more fully hereinafter. A compression member or piston 13 may be shiftable in each main cylinder 12, all in the conventional manner. In addition, the engine block or body 11 may be provided with a cylinder head 15 closing the upper or top end of the main cylinder 12 and having inlet and outlet passageways 16 and 17, respectively, communicating with the interior of main chamber 12 through inlet and outlet ports 18 and 19. The inlet passageway 16 and port 18 serve to conduct or feed a fluid fuel mixture, say air and fuel, to the main chamber 12 when the port 18 is open, and the outlet or exhaust passageway 17 serves to pass or conduct exhaust fluid from the chamber 12 when the exhaust or outlet port 19 is open. Inlet and outlet valves 20 and 21 may be respectively provided in operative association with inlet and outlet ports 18 and 19 to open and close the latter. Toward this end, the inlet and outlet valves 20 and 21 may be provided with actuating stems 22 and 23 operatively connected to suitable actuating means to effect opening and closing of the valves 20 and 21 in the desired timed relation. For example, the valves 20 and 21, as by their stems 22 and 23, may be connected in driven relation with respect to an engine camshaft in the usual manner. As thus far described, the engine 10 may be essentially conventional. While an electrical ignition system, say including spark plugs, is not shown, so that the engine 10 would appear to be of the Diesel cycle or compression-ignition type, it will presently become apparent that the instant invention may advantageously be employed with diesel or non-diesel engines and does not, in any case, require any electrical, hotspot or other conventional ignition systems.

Figure 4:
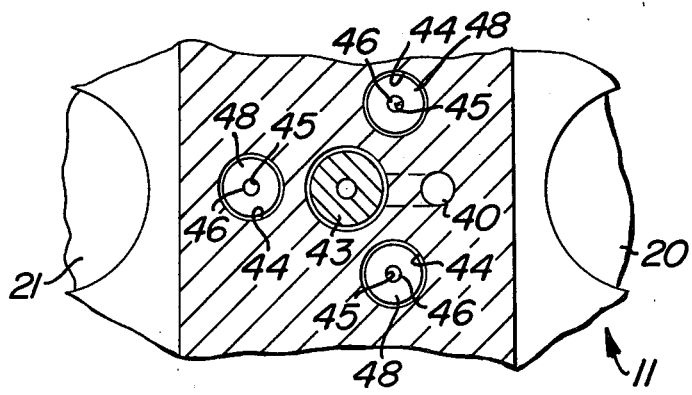
FIG. 4 is a sectional view taken generally along the line 4—4 of FIG. 1.

Referring now to FIGS. 1, 4 and 5, the cylinder head 15 is formed with an auxiliary combustion chamber or cylinder 25, relatively small as compared to the main combustion chamber or cylinder 12, and opening into the latter as through a valve seat or port 26. Within the auxiliary combustion chamber or cylinder 25, slidable therein toward and away from the open end or port 26 is an auxiliary combustion member or piston 27. Mounted in the auxiliary chamber 25 on the opposite side of piston 27 as outlet opening 26 is a retaining member or abutment 28, and resilient means, such as a coil compression spring 29 may be interposed between the abutment 28 and piston 27 to urge the latter toward the port 26 and main chamber 12. A piston rod or shank 30 may extend from the auxiliary piston 27, being suitably slidably mounted in an engine body portion 31, and carrying on its distal end remote from the piston an enlargement, head or follower 32. An auxiliary piston actuator or cam 33 may be rotatably mounted by a shaft 34, which is suitably journaled in the engine body portion 31 and connected to the engine timing system or crank shaft by suitable motion transmitting means. The actuator or cam 33 rotates with shaft 34 in the clockwise direction of arrow 35, as seen in FIG. 1, and includes a projecting cam portion or finger 36 engageable with head 32 to shift shaft 30 upward, as shown in the drawing and retract piston 27 away from auxiliary cylinder opening 26. The cam 33 and its shaft 34 are suitably connected in driven relation to the engine timing system to achieve a desired timed relation between operation of piston 27 and inlet and outlet valves 20 and 21, as will appear hereinafter in greater detail.

The cylinder head 15 is further formed with an auxiliary fuel passageway 40 opening into the auxiliary chamber 25 at a desired location along the path of movement of piston 27. A one-way or check valve 41 may be interposed in the fuel mixture passageway 40 to limit the flow of fuel mixture to one direction, that indicated by arrow 42.

Located in the auxiliary cylinder outlet opening or port 26 may be a port closure or valve member 43. A plurality of bores 44 are formed in the cylinderhead 15 generally parallel to and spaced about the auxiliary cylinder 25. The bores 44 may each include a reduced portion 45 opening into the main cylinder 12. A rod or stem 46 may extend longitudinally within each bore 44 and its reduced extension 45, being longitudinally shiftable therein, and a suitable seal 47 may be sealingly circumposed about the portion of stem 46 within reduced bore region 45. The seal 47 thus enables the stem 46 to shift longitudinally, while effectively precluding the passage of fluid through the reduced bore region 45. Each longitudinally shiftable stem 46 has one end extending into the main cylinder 12 and there provided with an enlargement or head 48 overlying and secured fast, as by welding or other suitable means, to the auxiliary cylinder valve member 43. The opposite end of each stem 46 may also be provided interiorly of its respective bore 44, with an enlargement or head 50 of a diameter less than the internal diameter of the receiving bore, and a coil compression spring 51 may be interposed beneath the stem head 50 to urge the stem upward to a retracted position.

It will now be appreciated that the several slidable stems 46 and their heads 48 serve to mount the auxiliary cylinder closure or valve member 43 for movement into and out of closing relation with the auxiliary cylinder outlet or port 26. The valve member or closure 43 is resiliently yieldably urged toward its closed position, that shown in FIG. 1, by the resilient forces of springs 51.

As best seen in FIG. 1, there is connected in fluid feeding communication with respect to the inlet passageway 16 of cylinder head 15 a fuel mixture charge means generally designated 55. The charge means 55 includes a conduit or air horn 56 having one end region 57 connected to the atmosphere or suitable supply of air or other combustion supporting medium. The other, opposite end region 58 of conduit means 56 is suitably connected to the cylinder head 15 in fluid communication with the fuel charge inlet passageway 16.

A fuel supply conduit or pipe 60, say for conducting liquid fuel, passes from a fuel source in the direction of arrow 61 and into the interior of fuel mixture charge conduit 56 to terminate in a spray head nozzle or outlet 62. To regulate the flow of fuel through outlet 62 there is provided an adjustable closure or valve member 63. More specifically, the spray head 62 may be of a generally conical upwardly and outwardly flaring configuration, and the regulating valve member or closure 63 may be of downwardly tapering conical configuration conformably engageable in the flaring element 62. The valve member 63 may include an upwardly extending stem 64 slidably shiftable in a generally spider like mounting structure 65 having a tubular hub 66 slidably receiving the stem 64.

Manual actuating means may be associated with the fuel supply nozzle 62, 63, as by a rotary crank shaft 67 extending generally diametrically across the conduit 56 having an external actuating arm 68 and an internal operating arm 69, which latter are connected by a link 70 to the upper end of stem 64. Thus, by selective longitudinal shifting positioning of control rod 71 connected to arm 68, to rotate crank shaft 67 in the opposite directions of arrows 78, the valve member 63 is selectively positioned vertically in a desired relation with respect to the flaring member 72 for discharging a predetermined rate of liquid fuel into the conduit 56.

In addition, the auxiliary chamber fuel feed passageway 40 may have its end 71 remote from the auxiliary chamber 25, communicating with the conduit 56 upstream of the fuel feed or spray head 62. Thus, the passageway 40 receives air from the conduit 56, and adjacent to the end 71 is provided with an internal restriction or Venturi 72. A fuel vessel or tank 73 exteriorly of the conduit 40 includes a discharge tube 74 extending generally upwardly from the tank 73 to terminate in an open end 75 in a region of Venturi 72. A liquid supply of fuel 76 is contained in the tank or vessel 73 and the discharge tube 74 to a level determined by a control float 77, in the manner of conventional carburetors. Thus, the vessel 73 and its discharge tube 74 combines with the restriction 72 of conduit 40 to define a Venturi passing a fuel-air mixture in the direction of arrow 42 for feeding auxiliary chamber 25. The fuel-air mixture in conduit 40 may be relatively rich as determined by the setting of control float 77.

In addition to the foregoing, the air-fuel mixture charge conduit 56 may be provided downstream of the fuel feeding means 72 with a bypass passageway 80. The bypass passageway 80 bypasses a valve 81 in the conduit 56 which valve may be of the butterfly type, including a plate mounted on a diametral pivotal axis 82 and rotatively controlled by an external crank arm 83 and a pivotally connected operating member or rod 84. The rod 84 may be actuated by a control solenoid 85. The solenoid 85 is operated in response to a temperature sensor 86 located in the conduit 56 to sense the air-fuel mixture temperature and, upon sufficiently low temperature to signal the solenoid 85 through conductors 87 to move the valve to its fully closed position. Under normal operating engines temperatures the valve 81 is fully open, but under colder than a predetermined engine temperature sensed at 86 the valve 81 is shifted to fully closed condition, as in cold starting. This serves to reduce total compression in the main cylinders, as will appear hereinafter, so that the likelihood of detonation in a cold operating high compression engine is effectively obviated or minimized.

The danger of detonation also occurs with an over rich fuel-air mixture. A mixture richness sensor is designated 90, extending into the conduit 56, and electrically connected, as by conductors 91, to solenoid 85 to actuate the latter and effect closure of valve 81 upon increase in fuel-air ratio or richness to a predetermined level. Thus, when the danger of detonation is increased by increased mixture richness, the valve 81 is caused to close and reduce compression in the main cylinder, which obviates or minimizes the possibility of detonation.

In addition to the cold temperature operating controls and mixture richness operating controls, and for use therewith, the bypass 10 includes a valve 93, which may be a butterfly valve mounted on a shaft 94 provided externally with a crank arm 95 connected to an operating rod 96. The operating rod 96 is, in turn, connected to a bellows 97, for operation thereby, and the bellows is in fluid communication through a conduit or tube 98, with the interior of fuel charge conduit 56. Therefore, when valve 81 is closed, as in cold starting or over rich mixture, and manifold vacuum increases, the bypass valve 93 is caused by the increased vacuum and control bellows 97 to open and maintain a desired vacuum sufficient to assure main cylinder compression just low enough to prevent detonation.

Ignition in main cylinder 12 is effectively assured without excessive compression and with relatively lean fuel mixtures. Upon closure of the inlet and outlet valves 20 and 21 and upward movement of main cylinder piston 13 to effect compression of relatively lean fuel mixture in the main cylinder, a relatively rich, or otherwise easily ignited mixture has entered from passageway 40, through one-way valve 41 into the relatively small auxiliary combustion chamber or cylinder 25. Cam 33 rotates to release piston 27 to compress the easily ignited fuel mixture in auxiliary chamber 25 and cause compression ignition thereof. Sufficient pressure is generated within the auxiliary chamber 25 to open valve member 43 against the closing force of resilient members 51 and pass ignited fuel from the auxiliary chamber to the main chamber, and thereby insure effective ignition of the lean main chamber mixture.

It will, therefore, be understood that the engine 10 may be a relatively highly efficient high compression engine employing relatively lean fuel mixtures, with resultant highly efficient ignition and fuel combustion in the main cylinder. Under optimum running conditions at normal operating temperatures the valve 81 will remain completely open, and the valve 93 may remain completely closed so that the overall flow rate of fuel mixture may remain substantially constant for achieving the desired cylinder compression. Further, the richness of fuel mixture may be controlled independently of the rate of flow of charge by control of the fuel supply conduit 60 in the manner described hereinbefore.

As an alternative to the fuel supply means 60–63 of FIG. 1, there is shown a fuel mixture conduit 56a, and mounted in spaced relation therein a Venturi duct 62a. That is, the duct or tube section 62a is located coaxially of and in spaced relation within the conduit 56a, by suitable mounting means, such as angularly spaced fasteners 64a. Thus, there is a passageway within tube section or duct 62a, and an external passageway 65a being generally annular in configuration and defined by the space between outer conduit 56a and inner duct section 62a. A fuel conduit 60a extends obliquely upwardly and inwardly into duct 62a, having its inner end open, as at 66a for dispensing liquid fuel by Venturi action.

Also within the duct 62a is a closure or valve 63a, say a butterfly valve having an external crank arm 68a and an operating member or rod 71a. Thus, flow of air without fuel passes through the annular space 65a, while a fuel-air mixture passes through the duct 62a. The quantity of fuel-air mixture may be selectively controlled by operation of control member 71a so that the overall fuel-air mixture of combined flows downstream of duct 62a is subject to external control as desired.

From the foregoing, it will now be appreciated that the engine of the present invention provides a simple non-electrical means to assure precisely timed ignition and thorough and economic combustion of a relatively lean mixture in a high compression engine, all without the adverse effects of detonation under cold or rich mixture operating conditions.

Although the present invention has been described is some detail by way of illustration and example for purposes of clarity of understanding, it is understood that certain changes and modifications may be made within the spirit of the invention.

What is claimed is:

1. In combination with an internal combustion engine including a relatively large main cylinder, a main piston associated with said main cylinder, and inlet and exhaust means for respectively passing a main fuel mixture into and combustion products out of said main cylinder, the improvement comprising a relatively small auxiliary cylinder opening directly into said main cylinder without an intervening passageway between said cylinders, an ignition valve between said main and auxiliary cylinders for opening and closing communication therebetween, auxiliary fuel mixture feeding means communicating with said auxiliary cylinder for feeding the latter, an auxiliary piston associated with said auxiliary cylinder for compressing the fuel mixture in said auxiliary cylinder to ignition when said main cylinder contains a compressed charge of fuel mixture, resilient means urging said auxiliary piston to compress a contained charge to ignition, timing means connected to said main piston, and cam means operatively connected between said timing means and auxiliary piston to retract the same for drawing auxiliary fuel mixture into said auxiliary cylinder and to release the auxiliary piston to compress the auxiliary fuel mixture to combustion, whereby opening of said valve means during ignition in said auxiliary cylinder communicates combustion to said main cylinder for ignition therein of a lean fuel mixture, said auxiliary fuel mixture feeding means including a check valve for passing fuel mixture under vacuum only into said auxiliary cylinder.

* * * * *